United States Patent

Hanson

[15] 3,640,409
[45] Feb. 8, 1972

[54] SILAGE DISTRIBUTION APPARATUS

[72] Inventor: Newell B. Hanson, Lake Lillian, Minn.

[73] Assignee: Hanson Silo Company, Lake Lillian, Minn.

[22] Filed: Aug. 20, 1970

[21] Appl. No.: 65,518

[52] U.S. Cl. .................................... 214/17 CB, 239/665
[51] Int. Cl. .................................................. B65g 65/32
[58] Field of Search ................ 214/17 A, 17 CC, 17 CB; 239/665

[56] References Cited

UNITED STATES PATENTS

| | | | |
|---|---|---|---|
| 3,360,140 | 12/1967 | Buschbom | 214/17 CB |
| 3,175,668 | 3/1965 | Stoltzfus | 214/17.64 X |

*Primary Examiner*—Gerald M. Forlenza
*Assistant Examiner*—Jerold M. Forsberg
*Attorney*—Merchant & Gould

[57] ABSTRACT

A frame pendulously attachable to the outlet end of a blower pipe or silage chute within a silo including a motor and gear box with a clutch arrangement therein so that a first generally horizontal plate is attachable to the motor for continuous rotation during energization of the motor and a second angularly disposed plate or deflection plate mounted above the generally horizontal plate for rotation during actuation of the clutch arrangement so that silage leaving the blower pipe is deflected onto the generally horizontal plate in substantially any desired direction. The entire pendulously mounted frame is adjustable relative to the end of the blower pipe so that silage can be distributed evenly throughout the entire silo.

3 Claims, 3 Drawing Figures

PATENTED FEB 8 1972
3,640,409
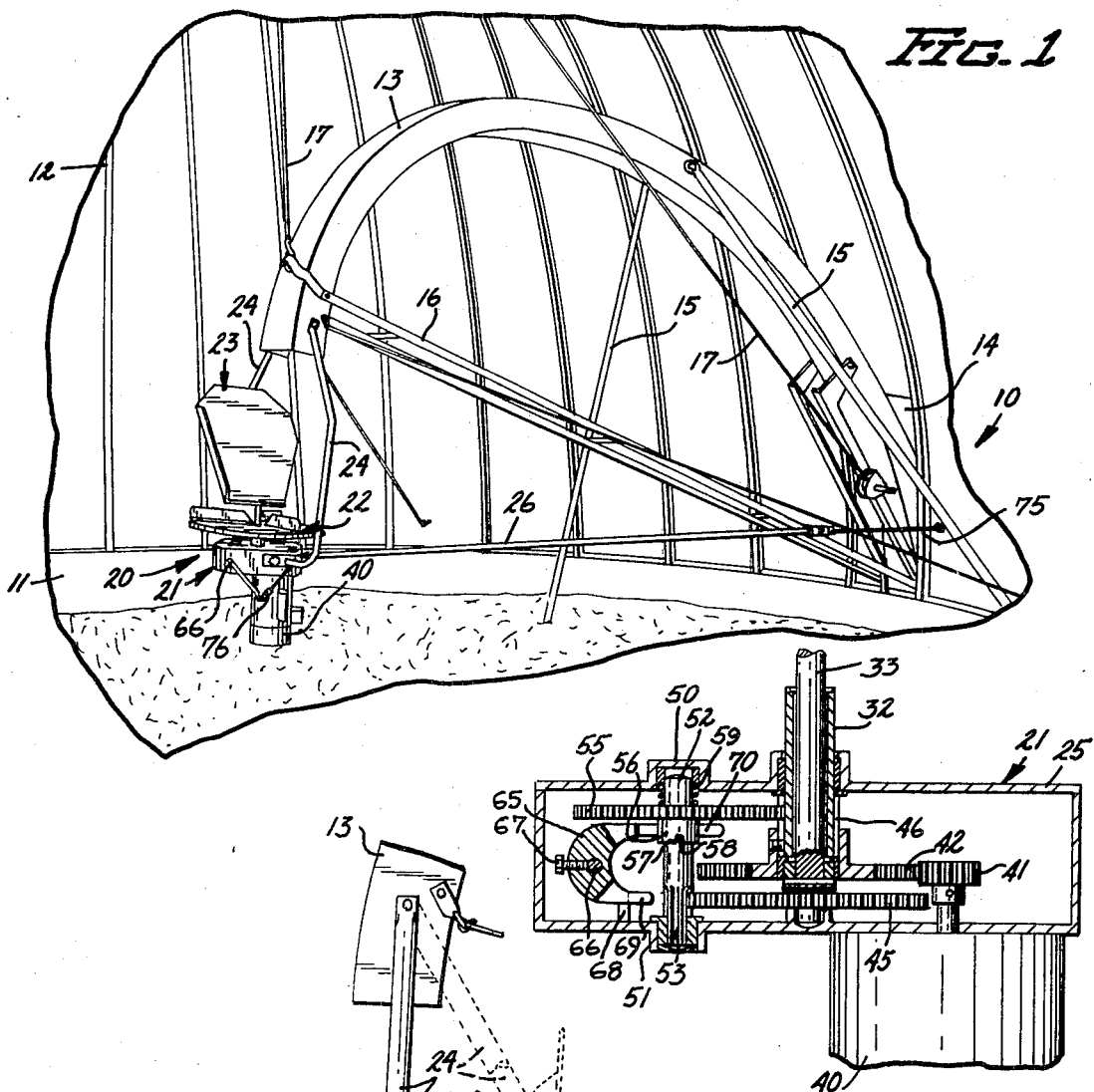
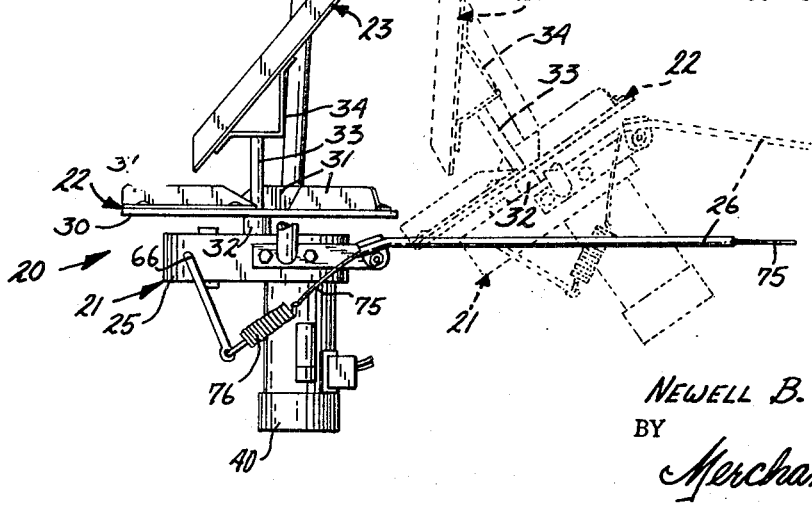
INVENTOR.
NEWELL B. HANSON
BY
Merchant & Gould
ATTORNEYS

{ 3,640,409 }

SILAGE DISTRIBUTION APPARATUS

BACKGROUND OF THE INVENTION

1. Field of the Invention

The present invention pertains to the distribution of silage as it is blown into a silo by means of well known and commercially available silage blowers. Silage blowers inject silage through the top of the silo and, because of the nature of silage, the material does not flow uniformly throughout the silo. Thus, some device must be utilized at the end of the blower pipe to distribute the silage within the silo.

2. Description of the Prior Art

In the prior art many devices are utilized to distribute the silage about the silo as it leaves the blower pipe. In general, these devices consist of apparatus for moving the outlet end of the pipe so as to direct the silage in different directions about the silo and devices mounted in the stream of silage from the blower for deflecting the stream in different directions about the silo. These devices are somewhat unsatisfactory because the silage is not distributed uniformly and large gaps or voids are produced where little or no silage is present, thereby greatly reducing the amount of silage which can be contained within a silo. In several prior art devices an apparatus is constructed which is rotatable under the impetus of the silage leaving the blower. These devices are somewhat unsatisfactory in that they rely strictly on the speed of the silage leaving the blower part for the distribution force. If the force of the silage leaving the blower pipe is diminished because of difficulties in the blower, etc., the silage is not properly distributed within the silo. Further, wear or dirt in the bearings of these devices greatly reduces their efficiency and ability to distribute the silage properly.

SUMMARY OF THE INVENTION

The present invention pertains to a silage distributor including a distribution member affixed to a motor for rotation therewith and a deflector rotatably mounted thereabove and attachable through a clutch arrangement to said motor for deflecting silage from the outlet of the blower pipe onto the distribution member at substantially any desired angle and means for altering the angle of the entire apparatus relative to the outlet end of the blower pipe.

It is an object of the present invention to provide a new and improved silage distributor.

It is a further object of the present invention to provide a silage distributor externally controllable for substantially uniformly distributing silage throughout the silo.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 1 is a view in perspective of the present silage distributor attached to the outlet end of a blower pipe within a silo;

FIG. 2 is an enlarged view in side elevation of the present silage distributor, illustrating a different position in dotted lines; and FIG. 3 is an enlarged fragmentary sectional view illustrating the internal parts of the drive mechanism.

DESCRIPTION OF THE PREFERRED EMBODIMENT

In the figures the numeral 10 generally designates a silo having a rigid upright cylindrical wall 11 with a generally hemispherical roof 12 affixed to the upper end thereof. A conventional silage blower having an elongated filler pipe attached thereto (not shown) is positioned exterior of the silo 10 with a silage chute 13 affixed to the upper end of the filler pipe and extending into the silo 10 through an opening 14 in the roof 12. The chute 13 is generally arcuately shaped and extends to approximately the center of the silo 10. In the present embodiment two struts 15 are affixed between the silo wall 11 and the chute 13 to maintain the chute 13 rigidly in position. Further, a brace 16 extends across the arcuate chute 13 from the opening 14 to adjacent the outlet end of the chute 13. In addition to the struts 15 and brace 16 a cable 17 is affixed to the chute 13 adjacent the outlet end thereof and is engaged over a pulley or the like (not shown) attached to the roof 12 to aid in installing the chute 13 and maintaining it in position. Silage distribution apparatus, generally designated 20, is operatively affixed to the chute 13 adjacent the outlet end thereof. It should be understood that the silage distribution apparatus 20 is illustrated with the chute 13 simply for exemplary purposes and it is believed that the apparatus 20 will operate with a large variety of silo filling apparatus.

The silage distribution apparatus 20 includes drive mechanism, generally designated 21, having a distribution member 22 and a deflecting member 23 operatively attached thereto with the entire structure pendulously attached to the chute 13 adjacent the outlet end thereof by means of a pair of U-shaped rods 24. Each of the rods 24 has an upper end pivotally affixed to the opposite sides of the chute 13 adjacent the outlet end thereof and the opposite ends of each of the rods 24 are pivotally affixed to opposite sides of a gear housing 25. Thus, the silage distribution apparatus 20 is mounted to normally hang below the outlet end of the chute 13 with the drive mechanism 21 directed downwardly and the distribution member 22 and deflecting member 23 directed upwardly toward the chute 13. An elongated rigid rod 26 is pivotally attached to the gear housing 25 and extends generally toward the opening 14 in the roof 12 of the silo 10. The outwardly extending end of the rod 26 is fixed to the brace 16 adjacent the opening 14 by means of a clamp, setscrew, etc., so that the outwardly extending end of the rod 26 can be loosened and moved to position the silage distribution apparatus at any desired angle beneath the outlet opening of the chute 13 or the silage distribution apparatus 20 can be completely removed from beneath the outlet opening of the chute 13, as illustrated in dotted lines in FIG. 2. It should be understood that the rod 26 is illustrated as one of the simplest means for adjusting the angle of the silage distribution apparatus 20 and many other devices may be devised by those skilled in the art.

The distribution member 22, in this embodiment, includes a flat circular plate 30 having three radially extending ribs 31, which may be pieces of angle iron or the like, affixed to the upper surface thereof. The upstanding ribs 31 will generally form an angle less than 90° with the upper surface of the plate 30 so that they form a partial ramp in the direction of rotation of the plate 30 and there is less tendency for silage to be entrapped thereby. The plate 30 is coaxially affixed to a hollow shaft 32 and the plate 30 has an opening therethrough coinciding with the opening in the hollow shaft 32 for receiving a solid shaft 33 therethrough. The deflecting member 23 is affixed to the upper end of the shaft 33 by means of an L-shaped bracket 34. The deflecting member 23 includes a flat sheet of material having a bend along the trailing edge thereof to prevent silage from sliding readily therefrom. The deflecting member 23 is mounted above the distribution member 22 and defines an angle of approximately 45° with the upper surface of the plate 30. Thus, silage leaving the outlet end of the chute 13 strikes the upwardly and outwardly directed surface of the deflecting member 23 and is deflected onto the outer portions of the distribution member 22. Because of the bend in the trailing edge of the deflecting member 23 and the ribs 31 on the plate 30, both the distribution member 22 and deflecting member 23 direct the flow of silage without entrapping undue amounts thereof.

A motor 40 is fixedly attached to the gear housing 25 and the drive shaft thereof, with a drive gear 41 affixed to the end, extends into the gear housing 25. The hollow shaft 32 is rotatably mounted in an upwardly directed opening in the housing 25 and a driven gear 42 is affixed to the lower end thereof within the housing 25 so as to mesh with the drive gear 41. Thus, energization of the motor 40 causes rotation of the drive gear 41 which in turn drives the driven gear 42 and rotates the hollow shaft 32. In the present embodiment the speed of the motor 40 and the ratio of the drive gear 41 to the driven gear 42 is such that the hollow shaft 32 rotates at approximately 500 r.p.m. It should be understood of course that the speed of the distribution member 22 depends upon the configuration thereof, the distribution desired and many other factors within the knowledge of those skilled in the art.

The solid shaft 33 affixed to the deflecting member 23 extends through the hollow shaft 32 into the housing 25 and has a gear 45 fixedly attached thereto adjacent the lower end thereof. Gear teeth 46 are formed in the outer surface of the hollow shaft 32 between the driven gear 42 and the upper wall of the housing 25. Two opposed projections 50 and 51 in opposite walls of the housing 25 have bearings fixed therein, which rotatably mount a stub shaft 52 parallel with and spaced from the shafts 32 and 33. The stub shaft 52 has gear teeth 53 formed in the outer surface thereof adjacent the lower end, which gear teeth 53 mesh with the gear 45 affixed to the lower end of the shaft 33. A gear 55 is rotatably mounted coaxially on the stub shaft 52 so that the gear 55 is free to rotate relative to the shaft 52. The diameter of the gear 55 is such that it meshes with the teeth 46 formed in the outer surface of the hollow shaft 32. The gear 55 has a downwardly extending sleeve 56 coaxially affixed thereto with a pair of diametrically aligned notches 57 in the lower edge thereof. A pin 58 is fixedly engaged through the stub shaft 52 with the ends thereof extending radially outwardly from each side sufficiently far to engage the notches 57 in the sleeve 56, upon proper longitudinal movement of the gear 55, and cause rotation of the stub shaft 52 with rotation of the gear 55. A compression spring 59 is coaxially positioned over the stub shaft 52 between the upper wall of the housing 25 and gear 55. The spring 59 provides a bias on the gear 55 urging it downwardly so that the notches 57 normally engage the pin 58. With the pin 58 and notches 57 engaged the solid shaft 33 is driven through the gear 55, gear teeth 53, stub shaft 52, gear 55 and gear teeth 46, which is fixedly attached to the hollow shaft 32. In this embodiment the ratios of the various gears are such that the solid shaft 33 is driven at approximately 10 r.p.m. although some changes with changes of speed in the distribution member 22 may be desirable, which changes are believed to be within the skill of those knowledgeable in the art.

A deactivating cam 65 is adjustably affixed to a shaft 66 by means of a set screw 67. The shaft 66 is pivotally mounted, generally horizontally in the housing 25, with one end extending outwardly through the side of the housing 25 and bent downwardly to form a lever, as illustrated in FIGS. 1 and 2. In this embodiment, the body of the deactivating cam 65 is formed in a generally crescent shape with a foot 68 extending vertically downwardly from the lower cusp and a finger 69 extending horizontally outwardly toward the gear teeth 53 from the lower cusp. In the normal position of the cam 65 the finger 69 is spaced from the gear teeth 53 and the foot 68 rests on the lower wall of the housing 25 to prevent clockwise rotation of the cam 65. A pair of elongated spaced apart fingers 70 extend horizontally outwardly from the upper cusp of the cam 65, on either side of the sleeve 56 and generally parallel with the lower surface of the gear 55. Rotation of the shaft 66 and the cam 65 in a counterclockwise direction (in FIG. 3) causes the fingers 70 to engage the gear 55 and force it longitudinally upwardly on the shaft 52 to disengage the notches 57 from the pin 58. Simultaneously the finger 69 engages the gear teeth 53 in the lower portion of the shaft 52 to prevent further rotation thereof. With the notches 57 and pin 58 disengaged the gear 55 rotates freely with the hollow shaft 32 and the stub shaft 52 is held in position by the finger 69, which in turn holds the solid shaft 33 fixedly in position through the gear teeth 53 and gear 45. Thus, the deactivating cam 65 forms a clutch through which the solid shaft 33 and the attached deflecting member 23 can be rotated continuously or to any desired position.

The rod 26 is illustrated as a hollow tube with a cable 75 extending therethrough. One end of the cable 75 is attached through a spring 76 to the outwardly extending end of the shaft 66 and the other end of the cable 75 is fixedly attached to some convenient structure, such as one of the struts 15 or the roof 12, adjacent the opening 14. Pulling the cable 75 to rotate the shaft 66 operates the deactivating cam 65 to disengage the solid shaft 33 from the drive mechanism and to stop it in any desired position. Thus, an operator at the opening 14 can adjust the angle of the entire silage distribution apparatus 20 relative to the outlet end of the chute 13 and can control the deflecting member 23 to provide continuous rotation thereof or to stop the deflecting member 23 in any desired position. Because of this unique control over the silage distribution apparatus 20, the silo 10 can be filled evenly to its utmost capacity, whereby the capacity is increased and unloading of the silo 10 is much easier. Besides increasing the capacity of the silo 10 and making unloading of the silo 10 easier, the silage distribution apparatus 20 greatly simplifies the filling of the silo 10.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. A silage distributor comprising:
   a. a silage deflector member defining at least a silage deflecting surface;
   b. a deflector member shaft mounting said deflector member for rotation about an axis with said deflecting surface angularly oriented relative to said axis;
   c. a distribution member defining a silage receiving surface having irregularities therein;
   d. a distribution member shaft mounting said distribution member for rotation about the rotary axis of said deflector member and generally therebelow for receiving silage on at least a portion of said distribution member from the deflecting surface of said deflector member;
   e. power means connected for producing rotation of said distribution member shaft upon proper energization of said power means;
   f. gear means rotatably responsive to rotation of said distribution member shaft;
   g. stub shaft means having means for driving said deflector member shaft and means for variable engagement with said gear means; and
   h. externally controllable clutch means for controlling engagement of said gear means with said stub shaft means and for causing engagement with said stub shaft, whereby when said clutch is in a first position said gear means will be in engagement with said stub shaft means causing said deflector member shaft to rotate responsive to the rotation of said distributor member shaft, and when said clutch is in a second position said gear means will be disengaged from said stub shaft means and said clutch will be in contact with said stub shaft means preventing rotation of said stub shaft means thus preventing rotation of said deflector member shaft.

2. A silage distributor as set forth in claim 1 including an adjustable frame for mounting the remainder of the apparatus generally below a silage chute with the rotary axis of the deflector chute forming an adjustable angle with the silage chute.

3. A silage distributor as set forth in claim 1 wherein the distribution member includes a generally flat plate having a plurality of spaced apart, radially extending generally upstanding fins for imparting a generally radial force component to silage striking the distribution member.

* * * * *